(12) United States Patent
Aida et al.

(10) Patent No.: US 7,321,401 B2
(45) Date of Patent: Jan. 22, 2008

(54) CONTOUR EMPHASIZING CIRCUIT

(75) Inventors: Toru Aida, Kanagawa (JP); Seiji Matsunaga, Kanagawa (JP); Junichi Onodera, Kanagawa (JP)

(73) Assignee: Fujitsu General Limited, Kawasaki-shi (JP)

( * ) Notice: Subject to any disclaimer, the term of this patent is extended or adjusted under 35 U.S.C. 154(b) by 513 days.

(21) Appl. No.: 11/063,238

(22) Filed: Feb. 22, 2005

(65) Prior Publication Data

US 2005/0190301 A1    Sep. 1, 2005

Related U.S. Application Data

(63) Continuation-in-part of application No. 09/463,642, filed on Jan. 24, 2000, now abandoned.

(51) Int. Cl.
*H04N 5/21* (2006.01)

(52) U.S. Cl. ...................... 348/625; 348/630

(58) Field of Classification Search ............... 348/625, 348/630, 628, 629; 382/266; *H04N 5/21, H04N 5/208*
See application file for complete search history.

(56) References Cited

U.S. PATENT DOCUMENTS 5,303,047 A    4/1994 Yoshida
5,923,213 A    7/1999 Darthenay et al.

FOREIGN PATENT DOCUMENTS

DE    2 260 621    6/1973

*Primary Examiner*—Sherrie Hsia
(74) *Attorney, Agent, or Firm*—Flynn, Theil, Boutell & Tanis, P.C.

(57) ABSTRACT

A contour emphasizing circuit which comprises a contour pick-up unit 10 for picking up a contour component HE from an input luminance signal Y, a level judging unit 15 for judging the luminance level of the input luminance signal Y, a coefficient control unit 17 for changing the coefficient in a plurality of steps depending upon a judgment signal and multiplying the contour component HE by the coefficient to output the product, and an adder 14 for adding the contour component outputted from the coefficient control unit 17 to the input luminance signal Y to output an emphasized-contour luminance signal. The coefficient to be multiplied by the contour component HE is changed in a plurality of steps depending upon the luminance level of the input luminance signal Y, and the contour component HE to be added to the input luminance signal Y is controlled to have a magnitude appropriate to the luminance level of the input luminance signal Y. As a result, the contour is emphasized according to the luminance level of the input luminance signal Y without causing excessive contour emphasis by adding a large contour component to a dark image of a small luminance level, thus preventing formation of unnatural images.

5 Claims, 3 Drawing Sheets

Prior Art

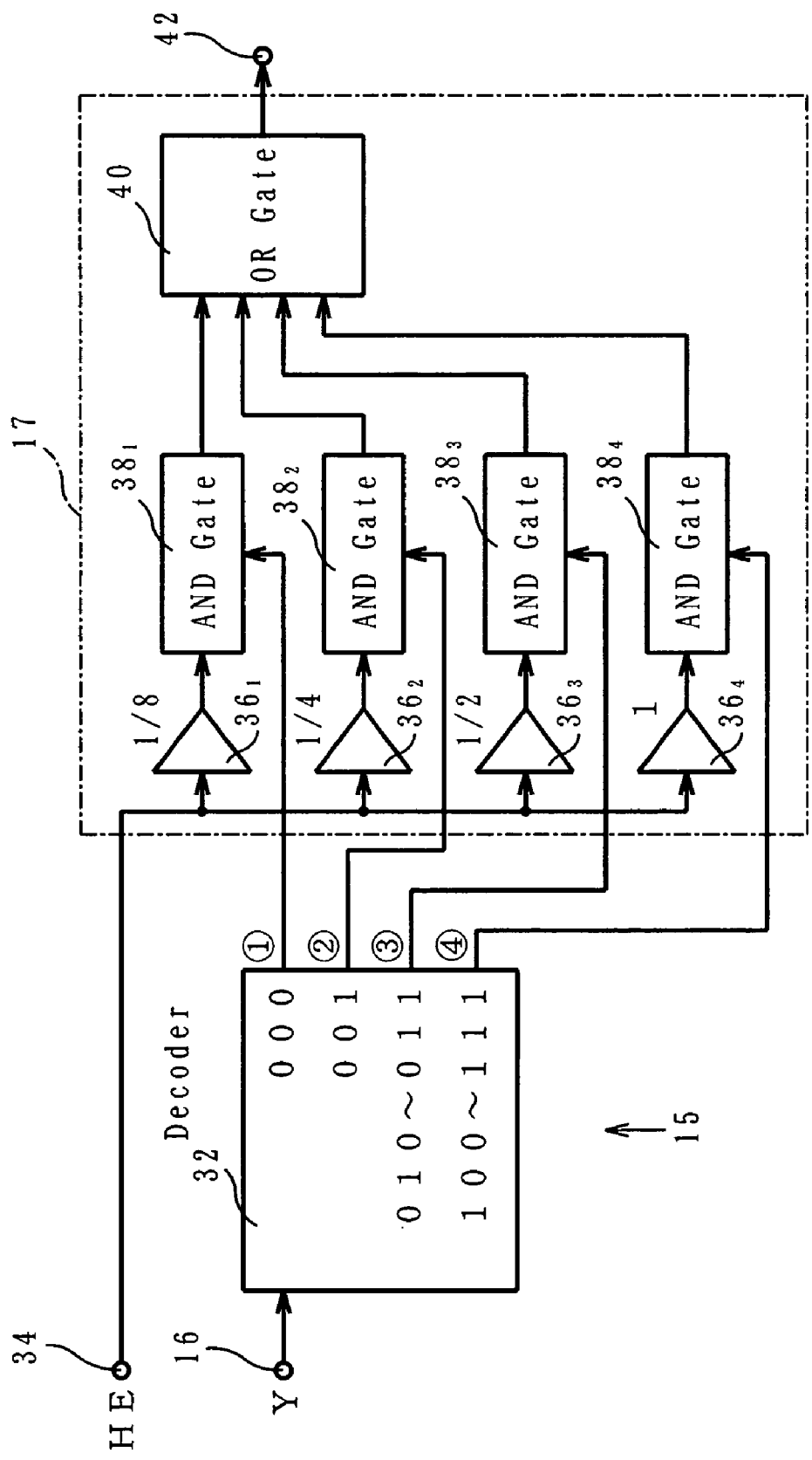

CONTOUR EMPHASIZING CIRCUIT

This application is a continuation-in-part of U.S. Ser. No. 09/463,642, filed Jan. 24, 2000 now abandoned.

TECHNICAL FIELD

The present invention relates to a contour emphasizing circuit designed for sampling a contour component from an input video signal (e.g., a digital input video signal), multiplying the sampled contour component by a coefficient (one of the coefficients including 1) for contour emphasis, and adding the product thereof to the input video signal for outputting a contour-emphasized video signal.

BACKGROUND OF THE INVENTION

PDP (Plasma Display Panel) equipment using a plasma display panel and LCD (Liquid Crystal Display) equipment using a liquid crystal display panel as thin and lightweight display equipment have come to attract public attention. Such display equipment is conventionally of the direct-drive type using a digital video signal, wherein a contour emphasizing circuit, such as shown in FIG. 1, is used for obtaining a contour-emphasized video signal from the input video signal.

The contour emphasizing circuit shown in FIG. 1 comprises a contour pick-up unit 10, a delay adjusting unit 12 and adder 14.

The contour pick-up unit 10 comprises one-dot delay units 18, 20 for sequentially delaying by one-dot the digital luminance signals (an example of a video signal) which have been input to the input terminal 16, an adder 22 for adding the luminance signal Y input to the input terminal 16 to the output signal from the one-dot terminal 20 to obtain the sum, a multiplier 24 for multiplying the sum by coefficient ¼ for outputting the product thereof, a multiplier 26 for multiplying the output signal from the one-dot delay unit 18 by coefficient ½ for outputting the product thereof, and a subtracter 28 for subtracting the output signal of the multiplier 24 from the output signal of the multiplier 26; wherein the contour component (i.e., high-pass component) HE in a horizontal direction of the reference picture element are sampled, for output, from the picture elements on the left side and right side (preceding and subsequent picture elements on a time basis) of the reference picture element.

A delay adjusting unit 12 is designed to adjust the timing of the luminance signal, as provided to the input terminal 16 and passed on to the adder 14, to the timing of the contour component HE as sampled by contour pick-up unit 10 and passed on to the adder 14. The delay adjusting unit 12 coordinates the timing of the luminance signal Y to the contour component HE by delaying the output of luminance signal Y, which has been input to the input terminal 16, for a predetermined time interval.

The adder 14 adds the luminance signal Y, which is output from the delay adjusting unit 12, to the contour component HE, which is sampled by the contour pick-up unit 10, to generate the sum (Y+HE) representing a contour-emphasized luminance signal.

However, the contour emphasizing circuit shown in FIG. 1 suffers from a problem, as is further described below, in that its design allows the contour component HE sampled by the contour pick-up unit 10 to be directly output to the adder 14 regardless of whether a high or low level of luminance signal Y is input to the input terminal 16.

As a result of the above problem, an unnatural picture having overemphasized contour can be produced if a contour component having too high a value is added to a relatively dark picture of a low luminance level. Another problem of the circuit is that the contour cannot be emphasized sufficiently if a contour component having to low a value is added to a bright picture having a high luminance level.

The present invention is designed for the purposes of solving the above problems and for providing a contour emphasizing circuit capable of accomplishing a level of contour emphasis that matches the luminance level of an input video signal.

DISCLOSURE OF THE INVENTION

The contour emphasizing circuit according to the present invention is characterized by comprising a contour pick-up unit for sampling a contour component from an input video signal, a luminance level judging unit for discriminating the luminance level of the input video signal, a coefficient control unit for not only selectively chooses a coefficient among a plurality of coefficients according to the judging signal from the luminance level judging unit but also multiplying the contour component sampled by means of a contour pick-up unit by a selected coefficient for the outputting the product thereof and an adder for adding the contour component output from the coefficient control unit to the input video signal for outputting a contour-emphasized video signal.

A coefficient is selected from among a plurality of coefficients, so that a plurality of coefficients are available for being multiplied by the contour component according to the luminance level of the input video signal. Thus, the picture can be prevented from becoming an unnatural picture by controlling the contour component to be added to the input video signal to a value matching the luminance level of the input video signal.

Further, the level judging unit may comprise a decoder for dividing the luminance level of the input video signal into n number of luminance levels by discriminating the luminance level of the input video signal on the basis of m-bit data of upper luminance levels, with n being equal to $2^{(m+1)}$, and the coefficient control unit may comprise n number of multipliers for multiplying the contour component, which is sampled by means of the contour pick-up unit, by the coefficient corresponding to each luminance level among n number of luminance levels for outputting the product thereof, wherein maximum coefficient values are either equal to 0 or fall within a range that is less than $½^x$ but greater than or equal to $½^{(x+1)}$, x being an integer ranging from 0 to n, n number of AND gates using, as the gate control signal, the signal interpreted by the decoders connected respectively to the output sides of the n number of multipliers and an OR gate connected to the output sides of the n number of the AND gates. By doing so, the level judging unit and the coefficient control unit can be formed easily.

Further, the level judging unit may comprise a decoder capable of discriminating each of 4 luminance levels of an input video signal, and the coefficient control unit may comprise 4 multipliers for multiplying the contour component, which is sampled by the contour pick-up unit, by one of the coefficients ⅛, ¼, ½ and 1 for outputting the product thereof, 4 AND gates respectively connected to the output sides of the 4 multipliers for using, as the gate control signal, the signal interpreted by the decoders respectively connected, and an OR gate connected to the output side of the 4 AND gates. By doing so, the level judging unit and the coefficient control unit can be formed more easily.

Further, the composition of the contour pick-up unit can be simplified by composing the contour pick-up unit with a horizontal contour component pick-up unit designed for sampling the contour component in the horizontal direction from the input video signal.

BRIEF DESCRIPTION OF THE DRAWINGS

FIG. 3 is a block diagram showing examples of the level judging unit and the coefficient control unit shown in FIG. 2.

BEST MODES FOR CARRYING OUT THE PRESENT INVENTION

The content of the present invention will be described in detail referring to the accompanying drawings.

Figure 1:
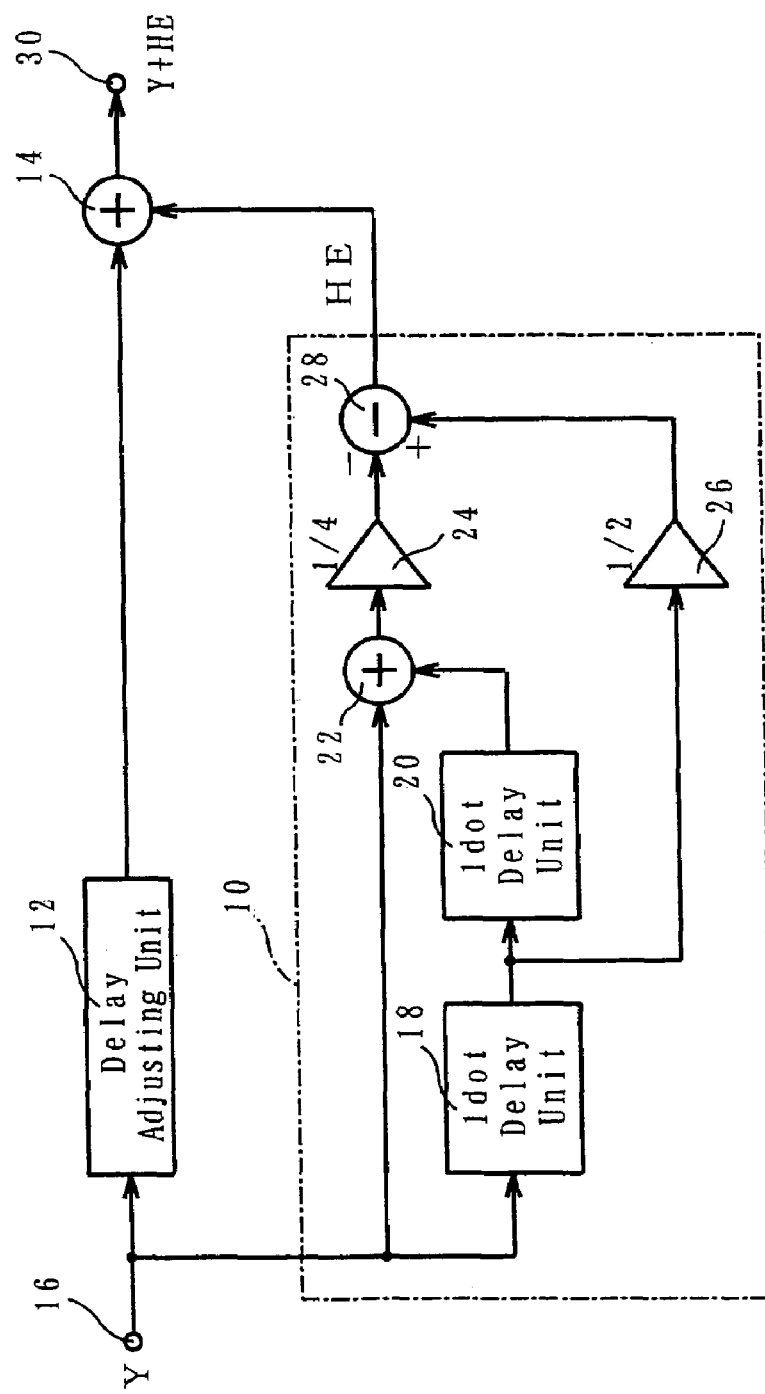
FIG. 1 is a block diagram showing an example of a conventional contour emphasizing circuit.
Figure 2:
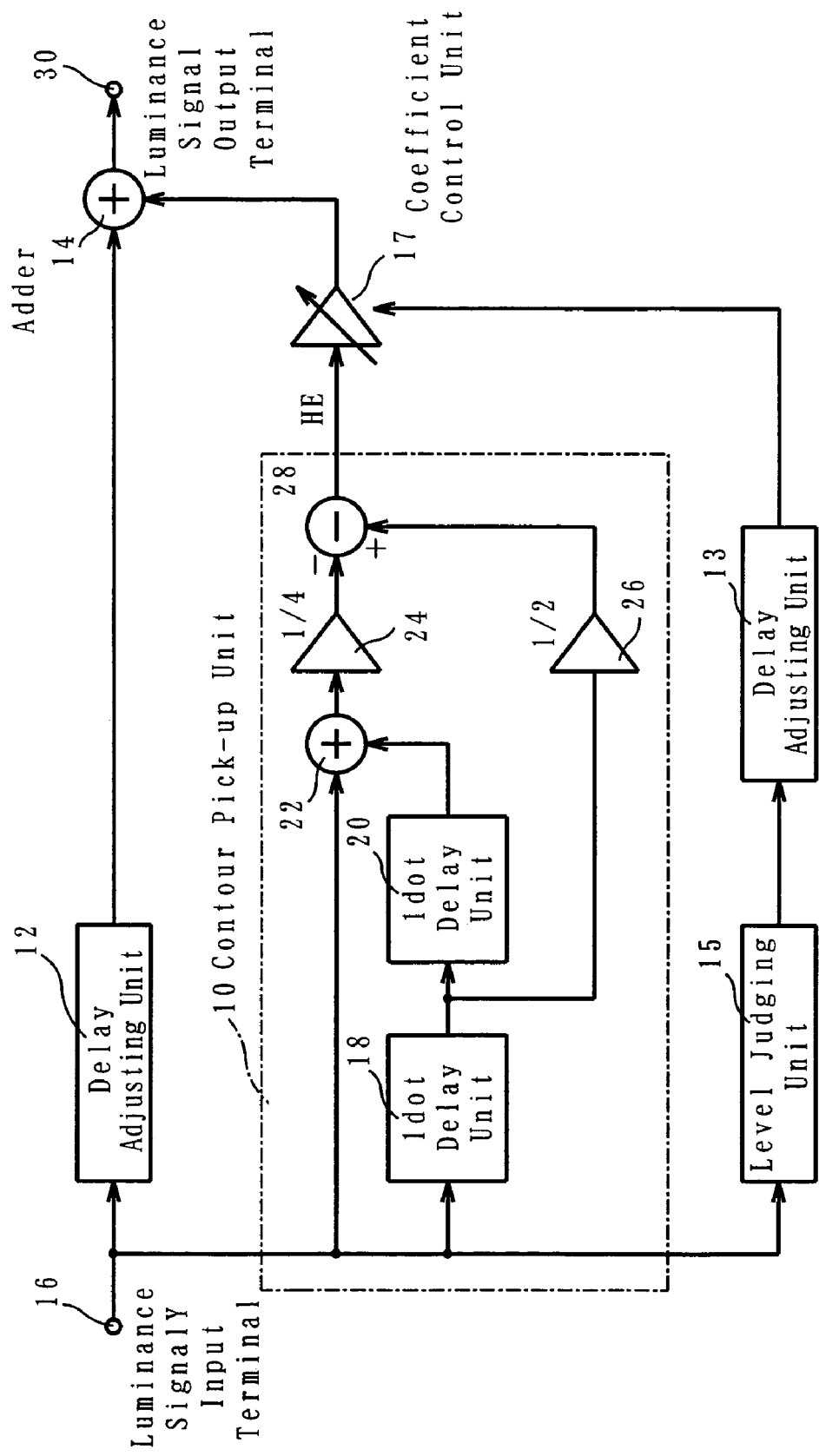
FIG. 2 is a block diagram showing an embodiment of the contour emphasizing circuit according to the present invention.

FIG. 2 shows a contour emphasizing circuit according to an embodiment of the present invention, wherein common reference numerals are assigned to those parts common to those shown in FIG. 1.

In FIG. 2, numeral 10 denotes the contour pick-up unit; 12,13, the delay adjusting unit; 14, an adder; 15, the level judging unit; 17, coefficient control unit.

The contour pick-up unit 10 comprises one-dot delay units 18, 20 for sequentially delaying by 1 dot the digital luminance signals (an example of a video signal) which have been input to the input terminal 16, an adder 22 for adding the luminance signal Y input to the input terminal 16 to the output signal from the one-dot terminal 20 to obtain the sum, a multiplier 24 for multiplying the sum by coefficient ¼ and for outputting the product thereof, and a subtracter 28 for subtracting the output signal of the multiplier 24 from the output signal of the multiplier 26; wherein the contour components HE in the horizontal direction are sampled, for output, from the picture elements on the left side and right side of the reference picture element.

The level judging unit 15 is designed to discriminate the luminance level of the luminance signal Y input to said input terminal 16 and output a corresponding judging signal. More specifically, as shown in FIG. 3, (the level judging unit 15) comprises the decoder 32 for decoding the luminance level of the luminance signal Y with reference to the values of the upper 3 bits of the 8-bit luminance signal Y. That is, the decoder 32 outputs a signal (e.g., H-level signal) corresponding to the output sides ①, ②, ③ and ④ depending on whether the values of the upper 3 bits of the luminance signal Y input to the input terminal 16 correspond to either [000], [001], [010~011] and [100~111]. Consequently, the decoder 32 determines whether the luminance level of the luminance signal Y corresponds to one of 4 levels of hexadecimal numbers, namely, [00~1F], [20~3F], [40~7F] and [80~FF].

The coefficient control unit 17 is designed to selectively change the coefficient according to a judging signal generated by the level judging unit 15 and delivered by way of the delay adjusting unit 13, as well as for multiplying the contour component sampled by means of the contour pick-up unit 10 by this coefficient, and for outputting the product thereof. More specifically, as shown in FIG. 3, the coefficient control unit 17 comprises four multipliers $36_1$, $36_2$, $36_3$ and $36_4$ that selectively multiply the contour component HE by the coefficients ⅛, ¼, ½ and 1, respectively, and then feed into four AND gates, $38_1$, $38_2$, $38_3$ and $38_4$, respectively. Each of the AND gates, $38_1$, $38_2$, $38_3$ and $38_4$, connects to one of the outputs of the decoder 32, thereby allowing the signal decoded by the decoder 32 to be used as a gate control signal. An OR gate 40 connects to the output sides of the four AND gates, $38_1$, $38_2$, $38_3$ and $38_4$; wherein the contour component is output to the adder 14 from the OR gate by way of the output terminal 42. It should be noted that in order to simplify the illustration of FIG. 3, the delay adjusting unit 13 interposed between the decoder 32 and the coefficient control unit 17 has been omitted and, as a result, the output terminals ①, ②, ③ and ④ in the diagram are shown as if the signals were directly input to the AND gates $38_1$, $38_2$, $38_3$ and $38_4$.

The delay adjusting unit 13 delays the judging signal generated by the level judging unit 15 for a predetermined time interval in order to respectively adjust the timing of the judging signal output to the coefficient control unit 17, as well as the contour component HE sampled from the input luminance signal by the contour pick-up unit 10.

The adder 14 adds the luminance signal Y, which has been input to the input terminal 16 and delayed for a predetermined time interval by the delay adjusting unit 12, to the contour component output from the coefficient control unit 17. The sum of the luminance signal Y and contour component output is then provided to the output terminal 30 as a contour-emphasized luminance signal.

The delay adjusting unit 12 delays the output of the luminance signal Y, which has been input to the input terminal 16, for a predetermined time interval in order to respectively adjust the timing for the input of the luminance signal to the adder 14 for combining with the contour component from the coefficient control unit 17.

Next, the functions of the parts shown in FIG. 2 will be explained with reference to FIG. 3.

The contour component HE is sampled from the 8-bit luminance signal, which has been input to the input terminal 16, by the contour pick-up unit 10. The sampled contour component HE is then input to the coefficient control unit 17.

(2) In FIG. 3, the decoder 32 and the coefficient control unit 17 respectively function as described in (a), (b), (c) and (d) below depending on whether the luminance level of the 8-bit signal provided at the input terminal 16 corresponds to one of four levels, i.e., [00~1F] (hexadecimal number; the same applies hereinafter), [20~3F], [40~7F] and [80~FF].

(a) Case where the luminance level of the luminance signal Y is [00~1F]:

The decoder 32 interprets that the luminance level is [00~1F] on the basis that the values of the upper 3 bits of the luminance signal Y is [000], and subsequently outputs an H-level signal from the output side ①. This output signal is delayed for a predetermined time interval by the delay adjusting unit 13 (not shown in FIG. 3) and then input to the AND gate $38_1$ for the electrification (i.e., being kept open) thereof. In this condition, L-level signals are output from the output sides ② through ④ of the decoder 32, so that other AND gates $38_2$ through $38_4$ are kept unelectrified (i.e., kept closed).

When the AND gate $38_1$ is electrified, the contour component (HE/8) multiplied by ⅛ by means of the multiplier $36_1$ is input to the adder 14 by way of the AND gate $38_1$, R gate 40 and output terminal 42.

(b) Case where the luminance level of luminance signal Y is [20~3F]:

The decoder 32 interprets that the luminance level is [20~3F] on the basis that the values of the upper 3 bits of the luminance signal Y are [001] and outputs an H-level signal from the output side ②. This output signal is delayed for a predetermined time interval by means of the delay adjusting unit 13 and then input to the AND gate $38_2$ for the electrification thereof.

When the AND gate $38_2$ is electrified, the contour component (HE/4), which has been multiplied by ¼ by multiplier $36_2$, is input to the adder 14 by way of the AND gate $38_2$, OR gate 40 and output terminal 42.

(c) Case where the luminance level of luminance signal Y is [40~7F]:

The decoder 32 interprets that the luminance level is [40~7F] on the basis that the values of the upper 3 bits are [010~011] and outputs an H-level signal from the output side ③. This output signal is delayed for a predetermined time interval by means of the delay adjusting unit 13 and then input to the AND gate $38_3$ for the electrification thereof.

When the AND gate $38_3$ is electrified, the contour component (HE/2) multiplied by ½ by means of the multiplier $36_3$ is input to the adder 14 through the AND gate $38_3$, OR gate 40 and output terminal 42.

(d) Case where the luminance level of luminance signal Y is [40~7F]:

The decoder 32 interprets that the luminance level is [40~7F] on the basis that the values of the upper 3 bits are [010~011] and outputs an H-level signal from the output side ④. This output signal is delayed for a predetermined time interval by means of the delay adjusting unit 13 and then input to the AND gate $38_4$ for the electrification thereof.

When the AND gate $38_4$ is electrified, the contour component (HE) multiplied by 1 by means of the multiplier 364 is input to the adder 14 through the AND gate $38_4$, OR gate 40 and output terminal 42.

(3) In FIG. 2, the adder 14 adds the contour component output from the coefficient control unit 17 to the luminance signal Y, which has been input to terminal 16 and delayed for a predetermined time interval by the delay adjusting unit 12, and outputs the sum to the output terminal 30 as a contour-emphasized luminance signal.

For instance, when the luminance level of the luminance signal is [00~1F], contour component (HE/8) is added to the luminance signal Y, and the sum (Y+HE/8) as a contour-emphasized luminance signal is output to the output terminal 30. Further, when the luminance level of the luminance signal Y are [20~3F], [40~7F] or [80~FF], contour component (HE/4), (HE/2) or (HE) is added to the luminance signal Y, and sum (Y+HE/4), (Y+HE/2) or (Y+HE) as a contour-emphasized luminance signal is output to the output terminal 30. Thus, contour emphasis matching the luminance level of luminance signal Y is available.

The embodiment described above relates to a case where the contour pick-up unit comprises a horizontal contour pick-up unit for sampling the contour component in a horizontal direction from the input video signal, but the present invention is not limited to this embodiment and is also applicable to other contour pick-up units as long as they are designed to sample the contour component from an input video signal. For example, the present invention is applicable to the case where a contour pick-up unit comprises a vertical contour pick-up unit designed for sampling the contour component in a vertical direction or to the case where a contour pick-up unit comprises a horizontal-vertical contour pick-up unit designed for sampling the contour component in both the horizontal and vertical directions.

The embodiment described above relates to a case where the level judging unit comprises a decoder for interpreting whether the luminance level of an input video signal corresponds to one of four luminance levels, and a coefficient control unit comprises four multipliers for multiplying the contour component sampled by means of the contour pick-up unit by any of coefficients ⅛, ¼, ½ and 1 for the output of respective products, four AND gates respectively connected to the output sides of the four multipliers for using the signal interpreted by the decoder as the gate signal and an OR gate connected to the output sides of the four AND gates, but the present invention is not limited to this embodiment. For example, the present invention is also applicable to a case where the level judging unit comprises a decoder for determining a luminance level of an input video signal corresponds to one of n number of levels, $n=2^{m-1}$, and the coefficient control unit comprises n number of multipliers for multiplying the contour component sampled by means of the contour pick-up unit by any one of n coefficients for outputting the product thereof, the coefficients having a value of $½^{n-x}$, x being an integer of from 1 to n, n number of AND gates respectively connected to the output sides of the n number of multipliers for using, as the gate control signal, the signals interpreted by a decoder, and an OR gate connected to the output sides of the n number of AND gates.

The embodiment described above relates to a case where the level judging unit comprises a decoder, and the coefficient control unit comprises multipliers, AND gates and an OR gate, but the present invention is not limited to this embodiment and is applicable also to the case where the level judging unit may be anything capable of discriminating the luminance level of an input video signal, and the coefficient control unit may be anything capable of selectively changing the coefficient according to the judging signal from the level judging unit, as well as for multiplying the contour component sampled by means of the contour pick-up unit by a corresponding coefficient for the output of the product thereof.

INDUSTRIAL APPLICABILITY

As described in the foregoing, the present invention relates to a contour emphasizing circuit designed for sampling a contour component from an input video signal, multiplying the sampled contour component by a contour emphasizing coefficient, adding the product thereof to the input video signal and outputting a contour-emphasized video signal, whereby the emphasized contour can be matched with the luminance level of the input video signal. Thus, the present invention can be used to prevent production of unnatural picture caused by overemphasizing the contour of a dark picture having a low luminance level by excessively adding a contour component, or by under emphasizing the contour of a bright picture having a high luminance level by adding an insufficient contour component.

What is claimed is:

1. A contour emphasizing circuit comprising:
a contour pick-up for sampling a contour component from an input video signal;
a level judging unit comprising a decoder for discriminating the luminance level of the input video signal from n number of luminance levels based on upper m-bit data of the luminance levels, n being equal to $2^{(m-1)}$;

a coefficient control unit for selectively choosing a coefficient from n number of coefficients based on the judging unit so that a high-value coefficient is selected for a high luminance level and a low value coefficient is selected for a low luminance level, multiplying the chosen coefficient by the sampled contour component to obtain a product and outputting the product; and an adder for adding the product to the input video signal and outputting a contour emphasized video signal, wherein coefficient values are either equal to zero or fall within a range that is less than $\frac{1}{2}^x$ but greater than or equal to $\frac{1}{2}^{(x+1)}$, x being an integer ranging from 0 to n.

2. The contour emphasizing circuit of claim 1, wherein the decoder correlates the luminance level of the input video signal to one of four luminance levels and the coefficient control unit comprises four multipliers for multiplying the contour components sampled by said contour pick-up unit by any of the coefficients, $\frac{1}{8}, \frac{1}{4}, \frac{1}{2}$ and 1 and outputting the product thereof, four AND gates respectively connected to an output side of the four multipliers for using the signal interpreted by said decoder as a gate control signal and an OR gate connected to the output sides of the four AND gates.

3. The contour emphasizing circuit according to claim 1, wherein said contour pick-up unit comprises a horizontal contour component pick-up unit for sampling the contour component in a horizontal direction from the input video signal.

4. A contour emphasizing circuit comprising:

a contour pick-up unit for sampling a contour component from an input video signal;

a decoder for discriminating the luminance level of the input video signal from n number of luminance levels based on upper m-bit data of the luminance levels, n being equal to $2^{(m-1)}$;

a coefficient control unit comprising multipliers and gates for selectively choosing n number of coefficients according to a decoded signal generated by said decoder and used as a gate control signal, such that a high-value contour emphasizing coefficient is selected for a high luminance level and a low-value contour emphasizing coefficient is selected for a low luminance level, to produce a contour component output by multiplying the selected contour emphasizing component with the contour component sampled by said contour pick-up unit; and an adder for adding the contour component output from the coefficient control unit to the input luminance signal for outputting a contour-emphasized luminance signal, wherein the coefficient control unit comprises n number of multipliers for multiplying the sampled contour components by any one of n coefficients having a value defined by $\frac{1}{2}^{n-x}$, where x is an integer ranging from 1 to n, along with n number of AND gates respectively connected to the output sides of the n number of multipliers for using the decoded signal generated by the decoder as the gate control signal, along with an OR gate connected to the output sides of the n number of AND gates.

5. The contour emphasizing circuit according to claim 4, wherein said contour pick-up unit comprises a horizontal contour component pick-up unit for sampling the contour component in a horizontal direction from the input video signal.

* * * * *